United States Patent [19]

Kennedy

[11] Patent Number: 5,903,903
[45] Date of Patent: May 11, 1999

[54] SYSTEM FOR DETERMINING THE SEQUENCE AND PLACEMENT OF PAGES FOR A MULTIPLE-PAGE DOCUMENT

[75] Inventor: Kevin Alan Kennedy, Kirkland, Wash.

[73] Assignee: Microsoft Corporation, Redmond, Wash.

[21] Appl. No.: 08/637,363

[22] Filed: Apr. 25, 1996

[51] Int. Cl.$^6$ ................................................ G06T 11/00
[52] U.S. Cl. ........................................................ 707/525
[58] Field of Search .................................. 707/517, 525, 707/527; 382/1; 283/36; 270/37, 58, 38; 355/323; 395/111, 101

[56] References Cited

U.S. PATENT DOCUMENTS

| 5,057,869 | 10/1991 | Graves et al. | 355/233 |
| 5,105,283 | 4/1992 | Forest et al. | 358/401 |
| 5,271,065 | 12/1993 | Rourke et al. | 382/1 |
| 5,363,480 | 11/1994 | Usami et al. | 395/145 |

OTHER PUBLICATIONS

Impress, Xtend, Inc., Impress (v. 1.1), Computer Select, Software Product Specifications, Dec. 1995.
DoubleUP, Legend Communications, Inc., DoubleUP Professional (v. 3.1), Computer Select, Software Product Specifications, Dec. 1995.
Press imposition software, The Seybold Report on Publishing Systems, v. 23, n. 15, pp. 74(2), Computer Select, Article, Apr. 1994.
Presswise, Adobe Systems, Inc., Adobe Presswise (v 2.5), Computer Select, Software Product specifications, Dec. 1995.

*Primary Examiner*—Joseph H. Feild
*Assistant Examiner*—Alford W. Kindred
*Attorney, Agent, or Firm*—Jones & Askew, LLP

[57] ABSTRACT

A system for determining the sequence and placement of pages for a multiple-page document. A user selects a number of pages on each side of a sheet. A total number of pages is defined for a document. An initial value is set for a sheet index that counts each sheet in the document. A current page (F) for a current sheet is then defined. A total number of sheets in the document (S) is calculated by dividing the total number of pages for the document by a total number of pages on one sheet. A total number of sheets remaining after the current sheet (Sl) is calculated by using the equation: S−(sheet index+1). A set of coefficients C1, C2, and C3 is selected for the current page based on the number of pages on each sheet side. A current page number is calculated for the current page by using the equation: C1+F+C2*S+C3*Sl. The current page number for the current page is recorded. Selecting a set of coefficients, calculating a current page number, and recording the current page number are repeated for each remaining page on the current sheet. When all of the remaining pages are on the current sheet have been determined, the sheet index is incremented. Finally, for each remaining sheet, the process is repeated from the step of defining a current page number (F) for a current sheet, and extending through the step of incrementing the sheet index.

23 Claims, 11 Drawing Sheets

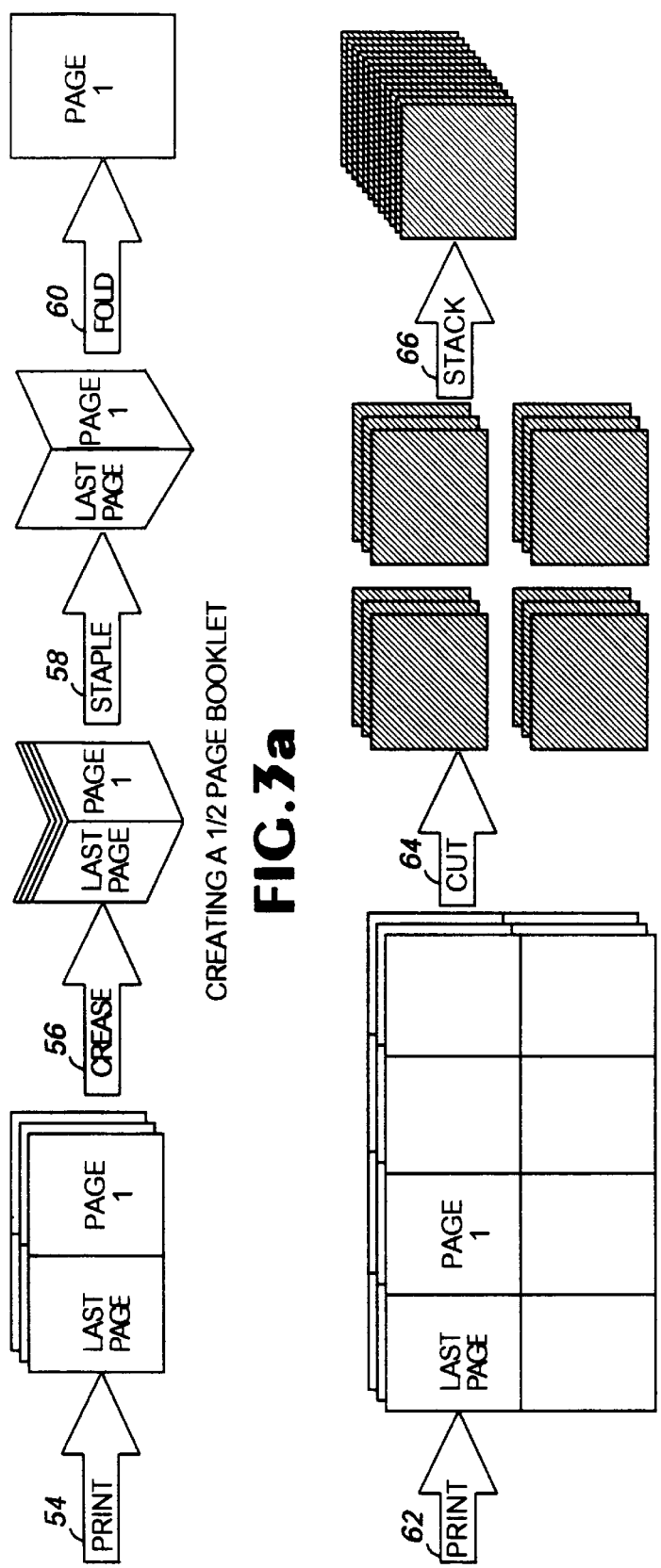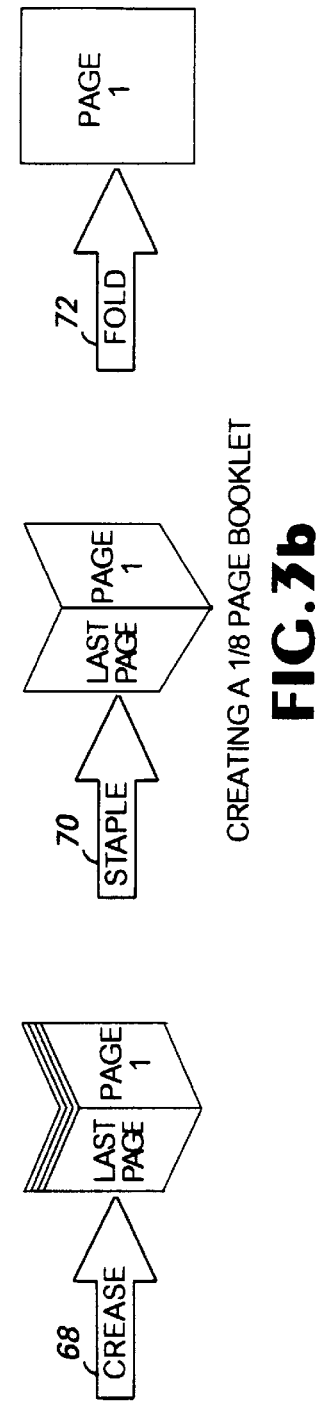
FIG. 3a CREATING A 1/2 PAGE BOOKLET
FIG. 3b CREATING A 1/8 PAGE BOOKLET

FIG. 8a

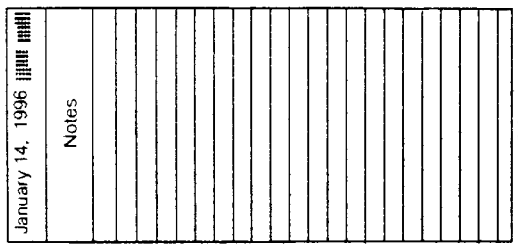
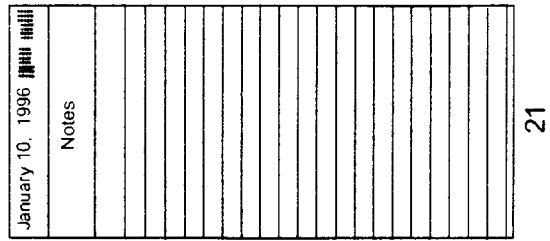
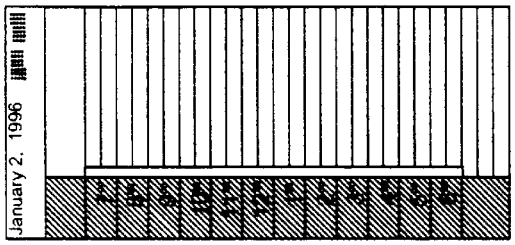
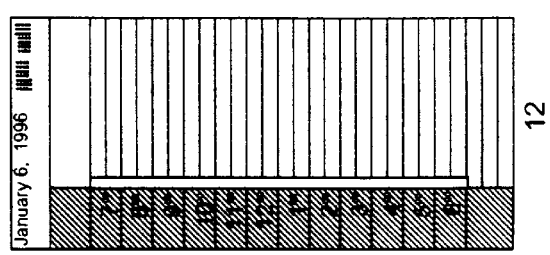
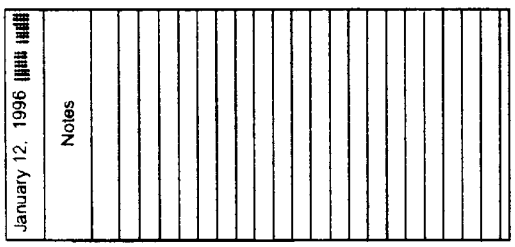
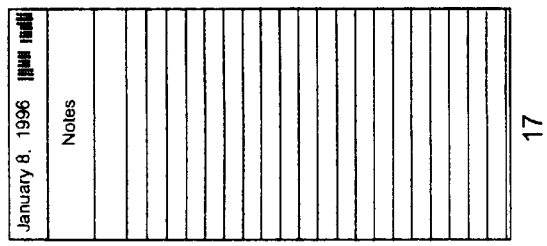
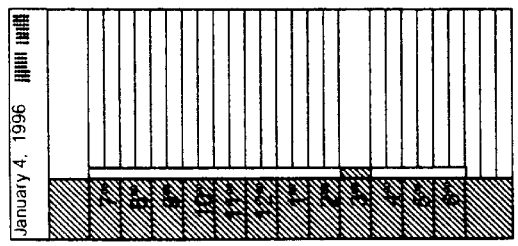
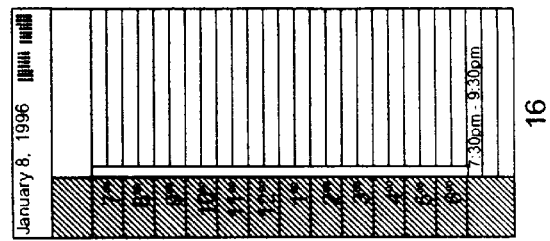
FIG. 8d

SYSTEM FOR DETERMINING THE SEQUENCE AND PLACEMENT OF PAGES FOR A MULTIPLE-PAGE DOCUMENT

FIELD OF THE INVENTION

The present invention relates to a system for determining the sequence and placement of pages for a document comprising multiple pages, and is more particularly directed to a system for determining the sequence and placement of pages for a multiple-page booklet in response to a print context defined by a user.

BACKGROUND OF THE INVENTION

In today's complex society, planning and organizing are essential tasks for managing a rigorous schedule. Many people utilize various tools for managing their hectic schedules. Such tools include electronic organizers, planners, daily calendars and software programs designed to allow a user to manage her own calendar, tasks, notes, and contacts. Typically, an individual uses at least one of these tools by referring to it throughout the day in order to keep up with appointments, tasks, and other important matters.

One apparent problem with some computer-oriented planning systems is that when the user wants a printed copy of her schedule or other relevant information, these systems are limited to printing one page of information onto each side of a single sheet of paper. As a result, should the user want to print, for example, a personal calendar for the next two weeks, a minimum number of seven sheets of paper would be printed if a double-sided printer is used. In this scenario, the user must carry around a personal calendar on a relatively thick stack of papers, which is certainly inconvenient for the user.

To further elaborate, many computer-oriented systems are also incapable of providing a printing arrangement beyond the one-half page case, whereby two pages of information are printed on each sheet side using a double-sided printer. In this case, a booklet may be formed by the user after printing the stack of sheets by: stacking the printed sheets in numerical order; folding the sheets in half; and stapling the sheets together along a center spine. Again, there is an issue of convenience, as well as practicality, which the user faces with this printing limitation.

Other systems, such as the "PUBLISHER" program and the "CREATIVE WRITER" program, employ a printing arrangement known as French-fold print. This printing arrangement prints four pages on one side of a sheet in quarter pages, whereby two of the four printed pages are upside down. After the sheet is printed, the paper is French folded by folding the sheet in half two times. For example, some greeting cards and announcements are printed and folded in this above-described manner. The problem with this printing arrangement is that a multiple-page booklet cannot be formed.

Furthermore, since many systems are incapable of printing beyond the two pages per side scheme, it is also reasonable to conclude that these systems are not designed to provide a numbering scheme beyond this limitation.

Therefore, there is a need for a system that is capable of printing multiple pages on a single sheet of paper, beyond the two pages per sheet limit. In addition, there is a need for a system that is capable of printing multiple sheets containing multiple pages to create a multiple-page document. Finally, there is a need for a system that is capable of determining the sequence and placement of pages for a multiple-page document in response to a print context defined by the user.

SUMMARY OF THE INVENTION

The present invention satisfies the above-described needs by providing an improved system for determining the sequence and placement of pages for a multiple-page document. The first step is to select a number of pages on each side of a sheet, wherein the sheet contains two sides, and each side of the sheet has at least one page. A total number of pages is defined for a document. Next, an initial value is set for a sheet index that counts each sheet in the document.

A current page (F) for a current sheet is then defined, wherein F is proportional to the sheet index. A total number of sheets in the document (S) is calculated by dividing the total number of pages for the document by a total number of pages on one sheet. In turn, a total number of sheets remaining after the current sheet (Sl) is calculated, wherein the total number of remaining sheets is defined by S−(sheet index+1). Next, a set of coefficients C1, C2, and C3 is selected for the current page based on the number of pages on each sheet side. After determining the values for F, S, Sl, C1, C2, and C3, a current page number is calculated for the current page. The current page number is defined by the equation C1+F+C2*S+C3*Sl. The current page number for the current page is recorded.

The steps of selecting a set of coefficients, calculating a current page number, and recording the current page number are repeated for each remaining page on the current sheet. When all of the remaining pages are on the current sheet have been determined, the sheet index is incremented. Finally, for each remaining sheet, the steps beginning with the step of defining a current page number (F) for a current sheet, and extending through the step of incrementing the sheet index are repeated.

After the page positions are determined and the sheets are printed, the user may create a booklet by: cutting each sheet into smaller sub-sheets so that each sub-sheet comprises only two pages, wherein each page has one page number; stacking the sub-sheets so that the page numbers are in numerical order; creasing each sub-sheet by folding it along a center line that divides one page of the sub-sheet from the remaining page; and finally, binding the sub-sheets along the center line so that the sub-sheets are attached to each other forming the booklet.

It is therefore an object of the present invention to provide an improved system for determining the sequence and placement of pages for a multiple-page document in response to a print context defined by a user.

It is a further object of the present invention to provide a system for printing multiple pages on a single sheet of paper to support the creation of a multiple-page document.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3a is a diagram that illustrates an overview of the steps involved completed by a user for the production of a booklet which has two pages per side.

FIG. 3b is a diagram that illustrates an overview of the steps completed by a user for the production of a booklet which has eight pages per side.

FIG. 8a is a diagram that illustrates the front side of sheet 0 printed by the print engine for a calendar with eight pages per side in accordance with the preferred embodiment of the present invention.

FIG. 8d is a diagram that illustrates the backside of sheet 1 printed by the print engine for a calendar with eight pages per side in accordance with the preferred embodiment of the present invention.

DETAILED DESCRIPTION OF THE PREFERRED EMBODIMENT

Figure 1:
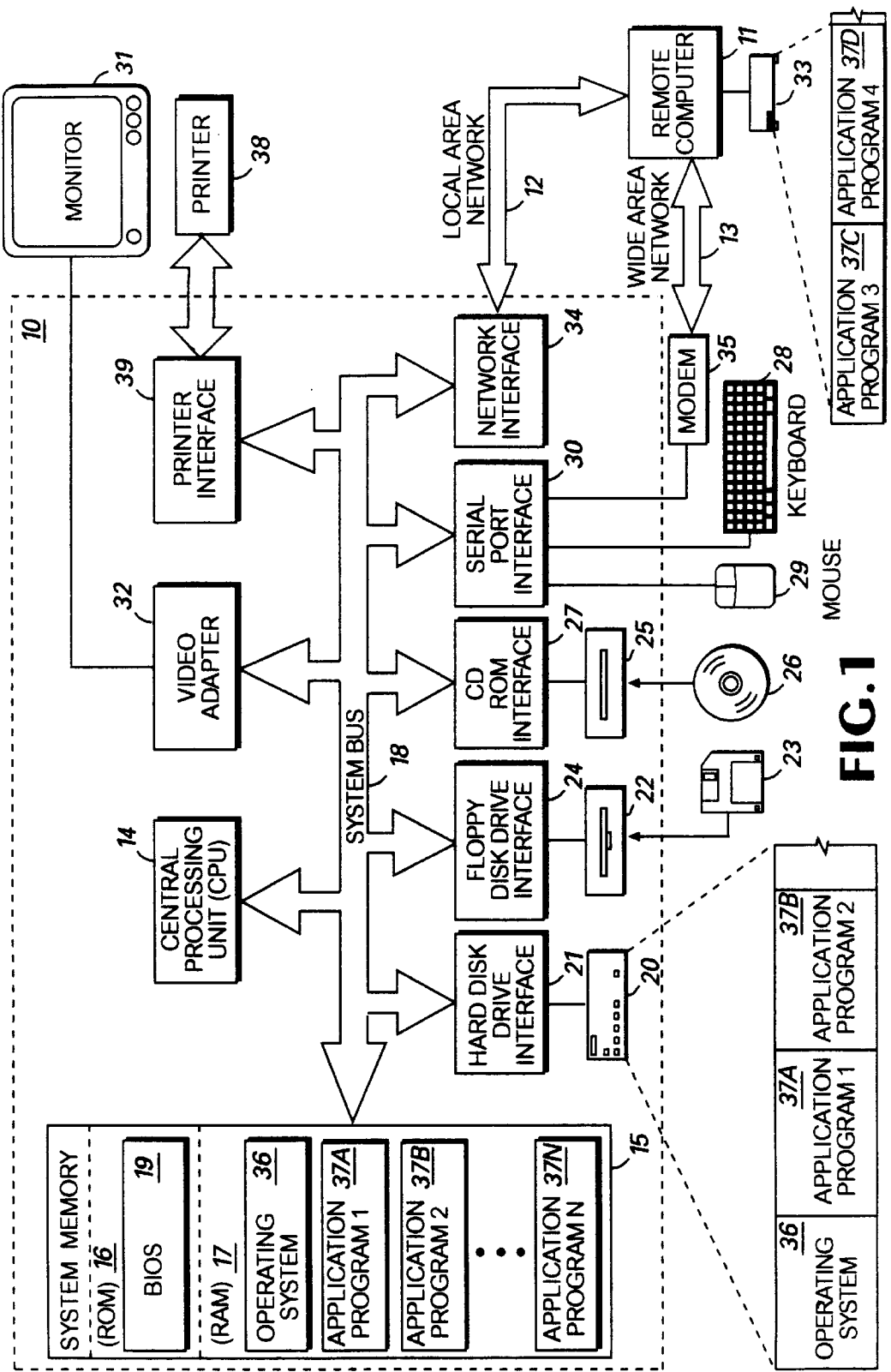
FIG. 1 is a block diagram of a personal computer that provides the operating environment for the preferred embodiment of the present invention.

The present invention is directed to a system for determining the sequence and placement of pages for a document comprising multiple pages, wherein a plurality of pages are located on the front and back sides of one or more sheets of paper. The preferred environment of the present invention is represented by "OUTLOOK" application program, which is marketed by Microsoft Corporation of Redmond, Wash. Briefly described, the preferred program allows a user to manage his own calendar, tasks, notes, and contacts, as well as share and exchange this information with others. The present invention provides a computer-implemented process for placing pages of a multiple-page document, and is used within the framework of the "OUTLOOK" program to support printing of such documents. This computer-implemented process supports printing of booklets by use of a regular double-sided printer. For example, the user can print and assemble a personal address book or planner by simply giving "OUTLOOK" commands, such as "Print these five mail messages" or "Print my calendar from today to next week." Thus, the preferred program provides a system for determining the sequence and placement of pages for a multiple-page document in response to a print context defined by the user.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices, display devices, and input devices. Furthermore, these processes and operations may utilize conventional computer components in a heterogeneous distributed computing environment, including remote file servers, compute servers, and memory storage devices. Each of these distributed computing components is accessible by the CPU via a communication network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, calculating, moving, positioning, placing, altering, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

As shown in FIG. 1, a personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a central processing unit (CPU) 14, such as the 80486 or "PENTIUM" microprocessors manufactured by Intel Corporation of Santa Clara, Calif. It will be understood that the computer 10 can include other CPU models, such as a member of the MIPS family by Silicon Graphics, Inc. or a Power PC processor by Motorola Corporation. The personal computer also includes system memory 15 (including read only memory (ROM) 16 and random access memory (RAM) 17), which is connected to the CPU 14 by a system bus 18. The BIOS 19 for the personal computer 10 is stored in ROM 16. Those skilled in the art will recognize that the BIOS 19 is a set of basic routines that helps to transfer information between elements within the preferred personal computer 10. Although the preferred computer 10 includes a ROM-based BIOS, those skilled in the art will appreciate that the computer 10 can be implemented by other computer models, such as The Apple "Macintosh" series or a SUN workstation.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, head-trackers, data gloves, pens, and other devices suitable for positioning a cursor on a computer monitor 31. The monitor 31 or other kind of display device is connected to the system bus 18 via a video adapter 32. A printer 38 is connected to the system bus 18 via a printer interface 39.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via one of the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is typically used to store data and programs, including the operating system and programs.

When the personal computer 10 is turned on or reset, the Basic Input/Output System (BIOS) 19, which is stored in the ROM 16, instructs the CPU 14 to load the operating system 36 from the hard disk drive 20 into the RAM 17. Once the operating system 36 is loaded into RAM 17, the CPU 14 executes the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program 37a. The operating system 36 interprets and carries out instructions issued by the user. For example, when the user wants to load an application program 37a, the operating system 36 interprets the instruction (e.g., double clicking on the application program's icon) and causes the CPU 14 to load the program code into RAM 17 from either the local hard disk drive 20, floppy disk 23, CD-ROM 26, or the remote memory storage device 33. Once the application program 37a is loaded into the RAM 17, it is executed by the CPU 14. In case of large programs, the CPU 14 loads various portions of program modules into RAM 17 as needed.

As discussed earlier, the preferred embodiment of the present invention is embodied in the "OUTLOOK" program, which is designed to operate with any Microsoft product that supports printing operation, such as the "PUBLISHER" program. In addition, an embodiment of the present invention can be incorporated at the operating system level of the "WINDOWS" operating system or in a print driver.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 or printing text on the attached printer 38. Generally described, the application program 37a communicates with the operating system 36 by calling predefined functions provided by the operating system 36. The operating system 36 responds by providing the requested information in a message or by executing the requested task.

Figure 2:
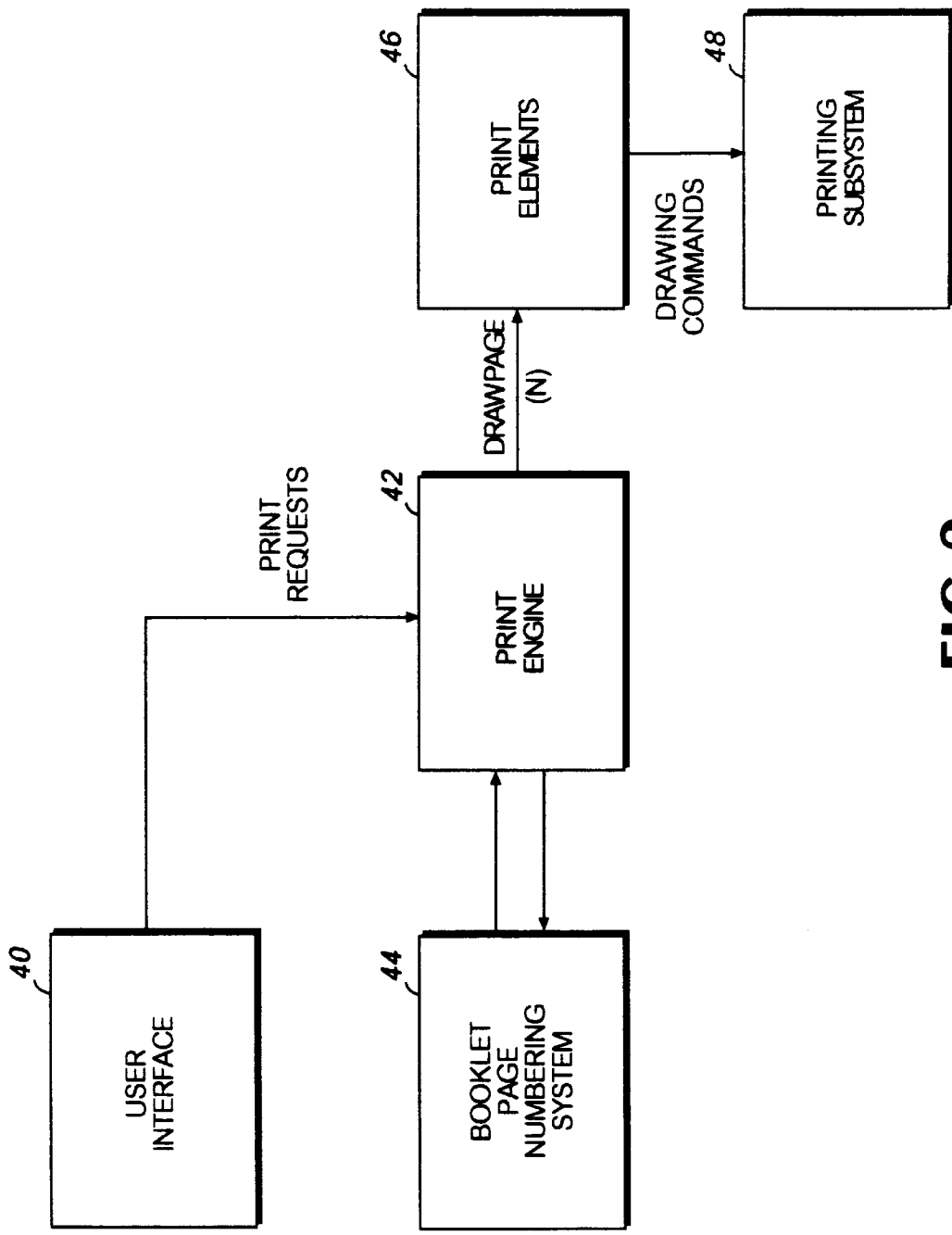
FIG. 2 is a block diagram of the printing environment of the preferred embodiment of the present invention.

Referring now to FIGS. 1 and 2, the printing environment for the preferred embodiment of the present invention will be described. A print engine 42 accepts print requests from the user, typically through a user interface 40 displayed on monitor 31. The print engine 42 controls printing operations and is embodied in the application program 37a. The user interface 40, preferably a graphical user interface (GUI), allows the user to define input parameters, such as the number of pages per side for a sheet in a document, and other print settings. The operating system 36 interprets the commands given by the user and sends its interpretation to the print engine 42. The print engine 42 processes the print request and input parameters, and therefore provides this processed information to the booklet page numbering system 44, which will be described in more detail below with respect to FIGS. 5 and 6. The page numbering system 44 outputs a document page index to the print engine 42, which tells the print engine 42 which sheet to print and which page position to use. Next, the print engine 42 sends a command to print elements 46 to print a current page based upon the information provided by the user. The print elements 46 define the type of information to be printed, such as schedules, mail addresses, e-mail, and so forth. The print elements 46 utilize a printing subsystem 48 for drawing commands. Once a print element is selected, the drawing command is implemented by the printing subsystem 48, and the sheet is printed by the printer 38.

In essence, the print engine 42 implements the page numbering system 44, which instructs the print engine 42 about a particular page to be rendered. The system 44 provides the page number position and the page number sequence to the print engine 42. For each page, the print engine 42 runs the page numbering system 44 only once. However, for each sheet, the print engine 42 runs the system as often as necessary to include all pages on the current sheet.

By using the computer 10 and the printer 38 of FIG. 1, in combination with the print system of FIG. 2, the user can print a stack of sheets containing multiple pages. However, in order to organize and bind this stack of sheets in a convenient and practical manner, the user typically creates a booklet. FIG. 3a illustrates an overview of the steps involved on the part of the user for the production of a booklet which has only two pages per side. In this case, only a few steps are required to produce the booklet.

Now turning to FIG. 3a, in step 54, the user prints sheets containing two pages per side with a corresponding page number for each page. The user creases each sheet in step 56 by folding it down the center, thereby dividing the two pages of each sheet. In step 58, the user opens the sheets and staples the sheets along the center so that the stack of sheets are connected to each other forming a booklet. Finally, in step 60, the user completely folds the stack along the same center where the crease is located to form a closed booklet. While the steps in FIG. 3a are rather simple with respect to a booklet mode of two pages per side, as the number of pages per side increases, the steps involved on the part of the user for the production of the booklet become more involved, as shown below with respect to FIG. 3b.

FIG. 3b illustrates an overview of the steps involved on the part of the user for the production of a booklet which has eight pages per side. Referring now to FIG. 3b, in step 62, the user prints sheets containing eight pages per side with a corresponding page number for each page. In step 64, the user then cuts the stack of sheets into smaller sheets consisting of only two pages. The user stacks the smaller sheets in step 66 so that the page numbers on each page are in numerical order. The user creases each smaller sheet in step 68 by folding it down the center, thereby dividing the two pages of each smaller sheet. In step 70, the user opens the smaller sheets and staples the smaller sheets along the center so that the stack of smaller sheets are connected to each other forming a booklet. Finally, in step 72, the user completely folds the stack along the same center where the crease is located to form a closed booklet.

By using the computer 10 and the printer 38 of FIG. 1, in combination with the print system of FIG. 2, the user can create a booklet comprising properly numbered pages. The flow chart of FIG. 4 illustrates the steps that the user follows to create a booklet comprising properly numbered pages.

Figure 4:
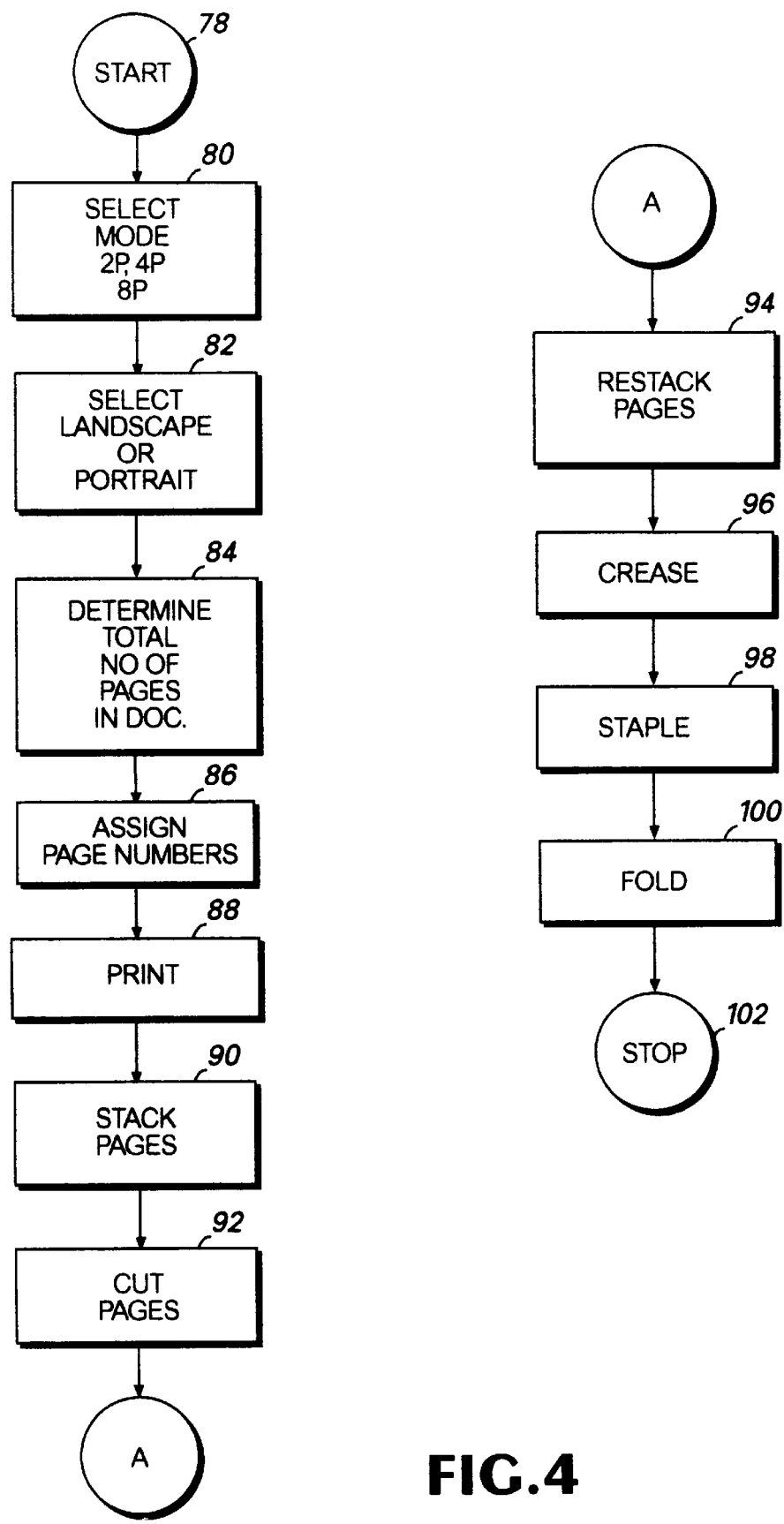
FIG. 4 is a flow chart illustrating a procedure that a user can follow to create a document comprised of properly numbered pages.

Now turning to FIG. 4, the user begins at the START step 78 by turning on the computer 10, selecting a desired program module, and then selecting the booklet page numbering computer-implemented process 44 to initiate printing operations. The user must then input specific information, which is described below, using the user interface 40 so that the page position for each page can be determined for proper imaging and printing. In step 80, the user must select a booklet mode that the user wants each sheet to be printed. For the present specification, a sheet refers herein to a standard sheet of paper containing two sides. The booklet mode defines the number of pages to print on each side of a sheet. For the preferred embodiment, the user may select two pages per side, four pages per side, and eight pages per side. Those skilled in the art will appreciate that the present invention is not limited to this set of booklet mode options.

Once the user has selected the booklet mode in step 80, the user then selects in step 82 the orientation of the pages to be printed on each sheet. The user may select either a portrait orientation or a landscape orientation. The portrait orientation is a format whereby the pages are positioned on the sheet with the short side up. The landscape orientation is a format whereby the pages are positioned on the sheet with the long side up. The reason the user must select which orientation the user wants is because the page number ordering is different for each orientation.

After the user has selected either the portrait or landscape orientation, the user inputs instructions indicating the data that the user wants printed. For instance, the user may give a command stating that the user wants a personal calendar to be printed for the next two weeks. From this information, the total number of pages in a document may be determined in step 84. For the example shown in FIGS. 8a–8d, the total number of pages is thirty-two, if there is a calendar schedule page, a notes page for each day of the week, a front cover, and a back cover.

Once the user has provided the information in steps 78, 80, and 82, page positions are assigned to pages with the appropriate page numbers in step 86. The pages are then imaged and sent to the printer 38 (FIG. 1). In step 88, the pages, with appropriate numbering, are printed on both sides of each sheet to be printed. Next, in step 90, the user stacks the printed sheets in the order in which the sheets were printed.

The following steps, steps 92–102, are applied in cases that involve more than two pages per side of a sheet, such as in the representative example in FIGS. 8a–d. In step 92, the user cuts the stack of sheets into smaller sheets consisting of only two pages. Next, the user stacks the smaller sheets in step 94 so that the page numbers on each page are in numerical order. Once the smaller sheets are stacked in numerical order, the user creases each smaller sheet in step 96 by folding it down the center, thereby dividing the two pages of each smaller sheet. In step 98, the smaller sheets are then bound along the center so that the stack of smaller sheets are connected to each other forming a booklet. The stack may be bound by staples, glue, or any method which achieves the same purpose. After the stack of smaller pages has been bound, the stack is folded in step 100 along the same center where the crease is located to form a booklet. Step 102 concludes the procedure the user follows to create a booklet comprising multiple pages.

Figure 5:
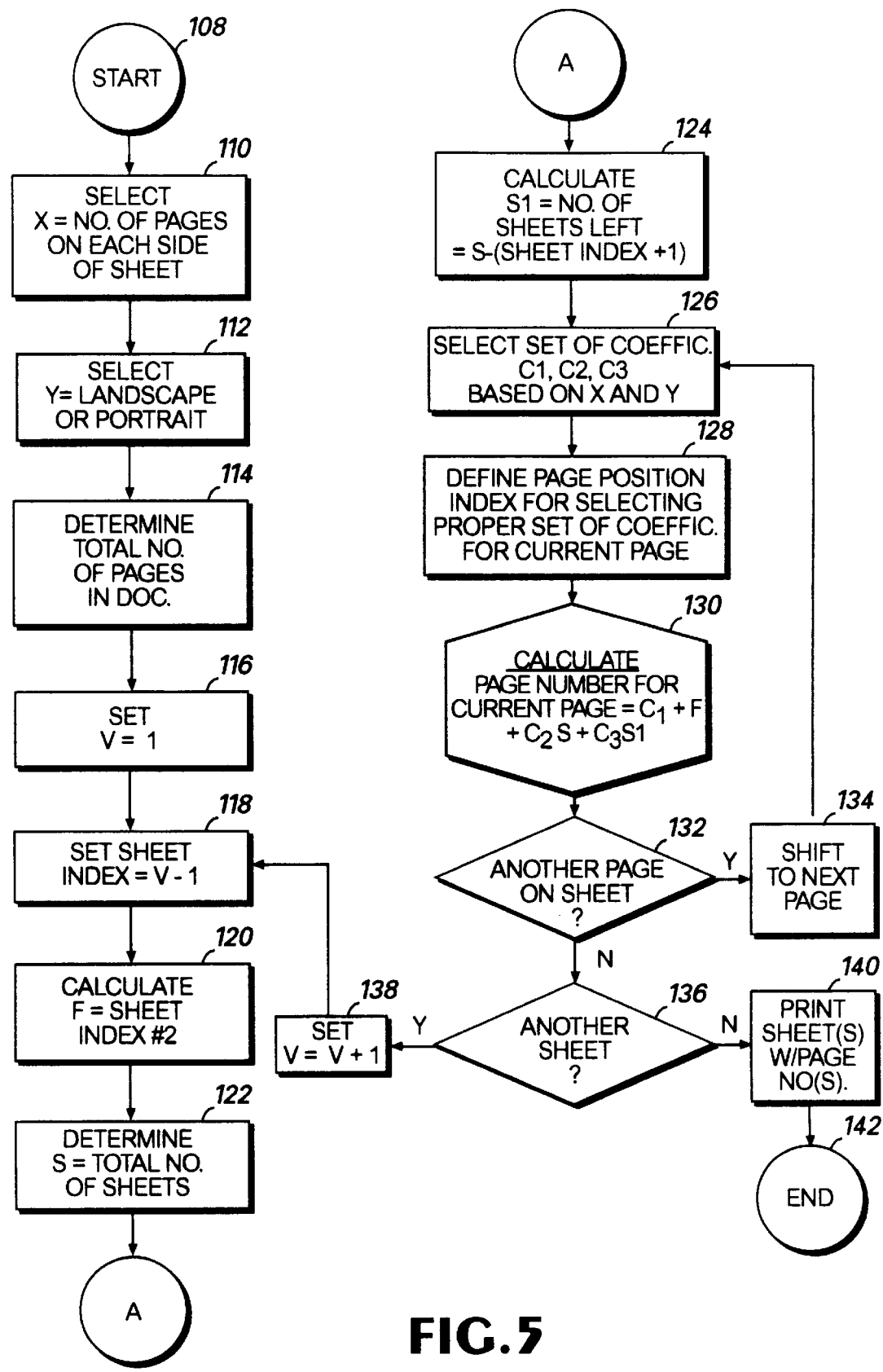
FIG. 5 is a flow chart illustrating a process for calculating a page number for each page on a sheet in accordance with the preferred embodiment of the present invention.

Referring now to the flow chart of FIG. 5, the process for calculating the page position for each page on a sheet is shown. The calculation for a page number is based upon an empirically-derived formula set forth by equation (1).

$$C1 + F + C2*S + C3*Sl; \qquad (1)$$

where C1, C2, and C3 are variables that represent a set of coefficients for a current page with values that are empirically determined based on the number of pages selected for each side of a sheet, F is a variable that represents a current page for a current sheet, S is a variable that represents the total number of sheets in the document, and Sl is a variable that represents the total number of sheets that remain after the current sheet.

The values for each variable C1, C2, C3, F, S, and Sl must be determined to calculate the current page number. Furthermore, equation (1) applies to any complex document printing mode. In other words, page positions with appropriate page numbers can be determined by using this formula for any number of pages per side, even beyond the practical limitation of eight pages per side. This can be achieved by deriving the proper array of coefficients for the selected number of pages per side and plugging in the values for the other variables in the formula.

The user begins at the START step 108 by turning on the computer 10 (FIG. 1), selecting a desired program module, and then selecting the booklet page numbering system 44 (FIG. 2) to initiate printing operations.

In step 110, the user selects a booklet mode, whereby "X" equals the number of pages on each side of a sheet. The user may select two pages per side, four pages per side, eight pages per side, and so forth so that "X" equals two, four, and eight, respectively.

Next, in step 112, the user selects the orientation, "Y", of the pages to be printed on each sheet. As previously discussed, the user may select either a portrait orientation or a landscape orientation.

The user can input instructions indicating the data that the user wants printed. In step 114, the total number of pages in a document is determined based on the user-supplied information.

In step 116, an arbitrary variable "V" is set-up to serve as a counter for counting the actual number of sheets that make up the document. For the first sheet, "V" equals one, as indicated in step 116. This variable "V" is used to calculate the sheet index in step 118 and is used to increment the counter in step 138.

In step 118, an initial value for a sheet index is calculated. The sheet index counts each sheet in the document from a zero base. In other words, the sheet index starts at zero. The sheet index is calculated by subtracting a value of one from the variable "V"—i.e., sheet index=V−1. The sheet index increases by a value of one for each sheet remaining in the document. In other words, the first sheet in the document has a sheet index of zero, the second sheet in the document has a sheet index of one, the third sheet in the document has a sheet index of two, and so forth. Also, the sheet index is used to calculate other values that will be discussed later with respect to FIG. 5.

After calculating the sheet index in step 118, the current page F for the current sheet is calculated in step 120 by multiplying the sheet index by a factor of two.

Next, in step 122, the total number of sheets in the document S is calculated by dividing the total number of pages for the document, which was determined in Step 114, by the total number of pages for one sheet.

In step 124, the total number of sheets left after the current sheet Sl is defined by the formula:

$$S-(\text{sheet index}+1),$$

where S and the sheet index have been previously determined in Steps 122 and 118, respectively.

After calculating F, S, and Sl, the next step 126 is to select a set of coefficients C1, C2, and C3 for the current page based on "X" and "Y", as previously determined in Steps 110 and 112, respectively. According to the initial selections made in steps 110 and 112, a page position index points in step 128 to the set of coefficients that corresponds to the current page position on the current sheet.

Figure 7A:
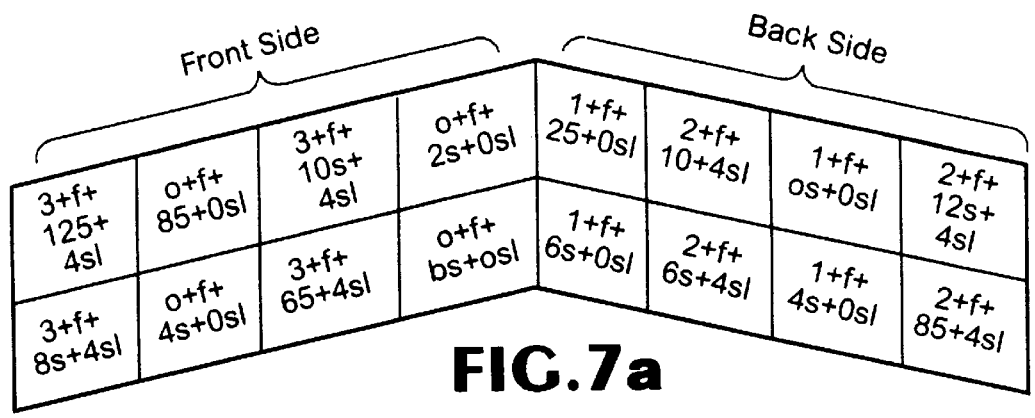
FIG. 7a is a diagram that shows the page layout of a set of coefficients within an array for a selection of eight pages per side, portrait orientation, in accordance with the preferred embodiment of the present invention.
Figure 7B:
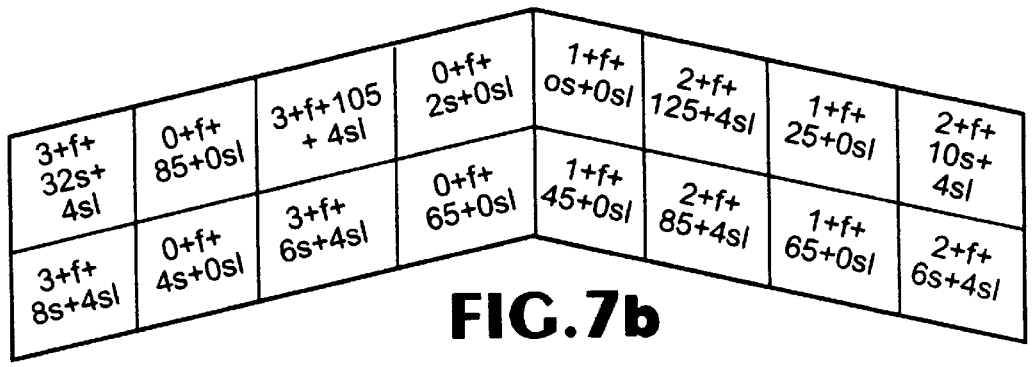
FIG. 7b is a diagram that shows the page layout of a set of coefficients within an array for a selection of eight pages per side, landscape orientation, in accordance with the preferred embodiment of the present invention.
Figure 7C:
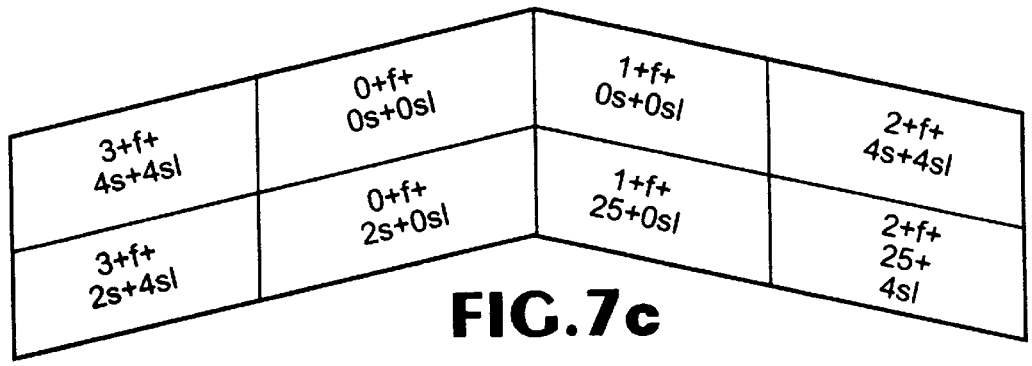
FIG. 7c is a diagram that shows the page layout of a set of coefficients within an array for a selection of four pages per side, landscape and portrait orientation, in accordance with the preferred embodiment of the present invention.
Figure 7D:
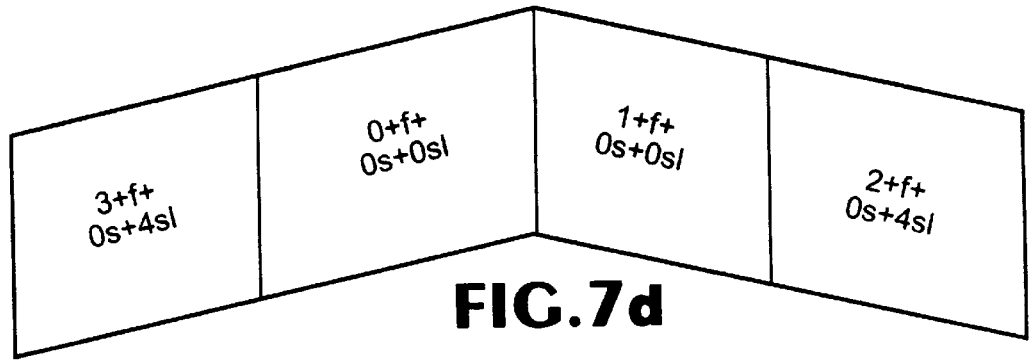
FIG. 7d is a diagram that shows the page layout of a set of coefficients within an array for a selection of two pages per side, landscape and portrait orientation, in accordance with the preferred embodiment of the present invention.

The page position index determines which array of coefficients, as well as which set of coefficients within the array apply to the formula based upon the selection of: 1) 8 pages per side, portrait (FIG. 7a); 2) 8 pages per side, landscape (FIG. 7b); 3) 4 pages per side, landscape or portrait (FIG. 7c); 4) 2 pages per side, landscape or portrait (FIG. 7d).

As noted in FIGS. 7a–7d, the coefficients C1, C2, and C3 are predetermined for each page position. On the other hand, F, S, and Sl vary according to the current sheet index, the number of sheets remaining in the document, and the total number of sheets in the document.

An array of coefficients can also be predetermined for modes beyond the ones represented by FIGS. 7a–7d. After determining the array of coefficients for a mode defining sixteen pages per side and portrait, for instance, the empirically-derived formula set forth by equation 1 may be used to calculate the current page number for any page position on a sheet. Those skilled in the art will appreciate that this formula applies to any mode selected.

Returning to FIG. 5, after determining the values of all variables in the generic formula, the current page number 130 is calculated for the current page by using the formula set forth in equation (1).

$$C1+F+C2*S+C3*Sl. \qquad (1)$$

After calculating the page number for the current page, in step 132, a determination is made whether there is another page on the current sheet that needs a page number. If there is another page, then the "yes" branch is followed to step 134; otherwise the "no" branch is followed to step 136. In step 134, the next page position is selected to determine the page number. Next, repeat steps 126–132 until there are no pages remaining on the current sheet. When all pages for a current sheet have corresponding page numbers, an inquiry is conducted in step 136 to determine whether there is another sheet left in the document. If so, increment the counter in step 138 by using the formula V=V+1, where V has been previously defined in step 116. After incrementing the counter, repeat steps 118–136 for each remaining sheet. However, if there are no sheets left in the document, perform step 140 by printing all of the sheets that have pages with appropriate page numbers. The page numbering process terminates at the END step 142.

Figure 6:
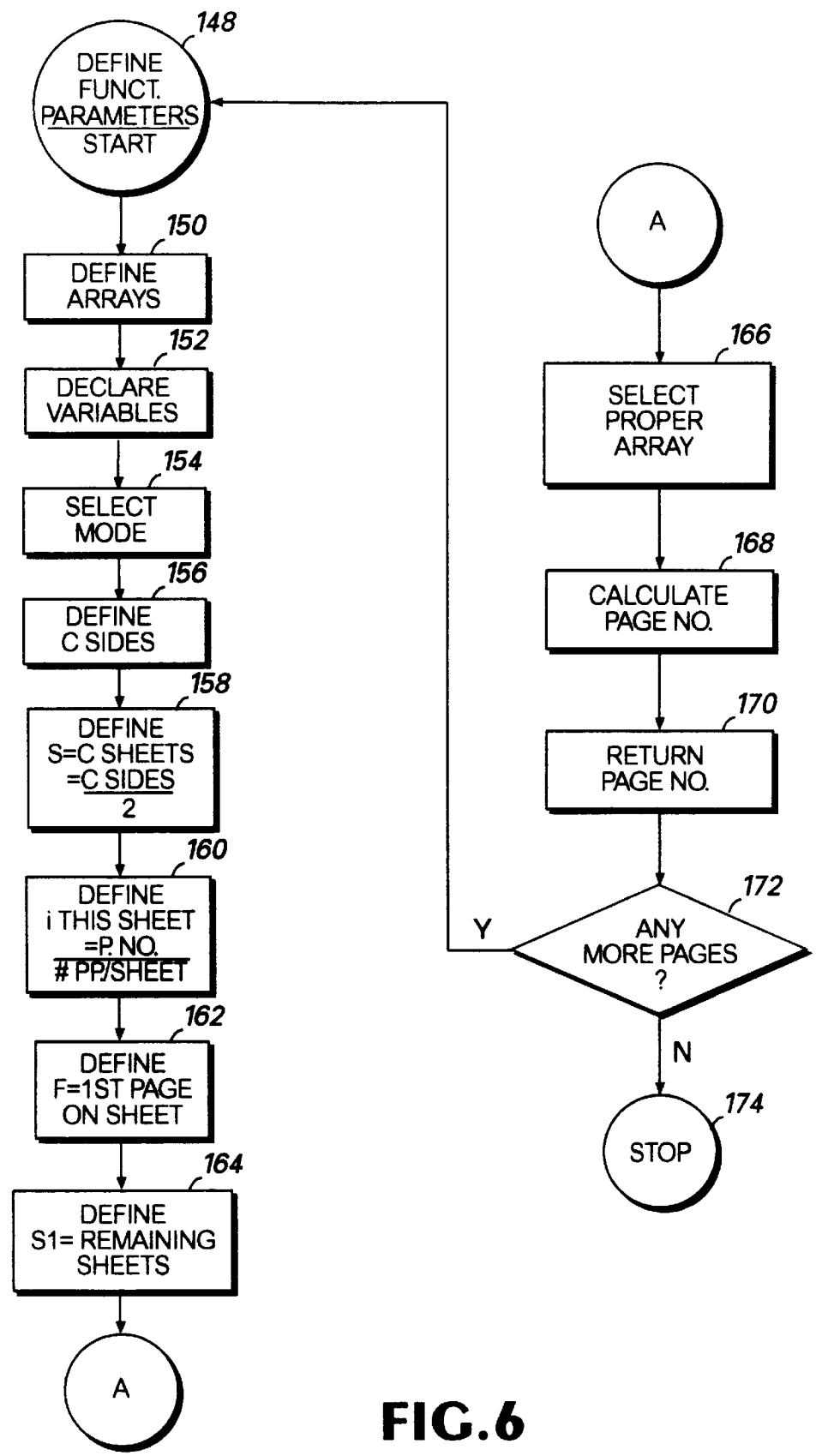
FIG. 6 is a flow chart which provides an illustration of a computer-implemented process for determining the sequence and placement of pages for a multiple-page document in accordance with the preferred embodiment of the present invention.

FIG. 6 is a flow chart which provides an illustration of the steps of the page numbering system 44 (FIG. 1) for determining the sequence and placement of pages for a multiple-page document in accordance with the preferred embodiment of the present invention. In step 148, the input parameters that are necessary for calculation of the current page number are defined. The input parameters include information such as the booklet mode, the print setting or orientation of the pages, and the total number of pages in the document.

Once the input parameters have been defined, fixed coefficients are defined in step 150, which are ordered in groups of three and stored within arrays, based on the booklet mode and print orientation. These coefficients are "hard-coded" based on the booklet mode, as previously described.

Next, variables are declared in step 152 based upon the information entered by the user, such as the number of pages per side of a sheet and the orientation of the pages on the sheet. When selecting a mode in step 154, the program determines the particular set of coefficients to use based on the position of a pointer to the arrays.

In step 156, the total number of sides of sheets in a document is defined as csides. After defining csides, csheets can be calculated in step 158 by dividing csides by two. Note that csheets which is the total number of sheets in the document is the same as S. Next, in step 160, the page position index is defined to determine the ratio of the current page number to the number of pages per sheet. In step 162, a first page on the current sheet F is defined, and the remaining sheets after the current sheet Sl is defined in step 164.

In step 166, the pointer selects the proper coefficients from the array. Next, in step 168, the page number is calculated using the formula set forth in equation (1). In step 170, a page number is returned to the print engine 42 (FIG. 2). An inquiry is conducted to determine whether there is another page available for printing in step 172. If so, the print engine 42 restarts the sequence of steps beginning with step 148. Otherwise, the printer 38 (FIG. 1) prints the sheets. Step 174 ends the process.

Table 1 below shows the actual page numbering system pseudo-code that was created for determining the sequence and placement of pages for a multiple-page document in accordance with the preferred embodiment of the present invention.

TABLE 1

Page Numbering System Pseudo-code.

```
int CPhysicalPage: :TransPageNo (int PageNo, RenPrintInfo *prpi,
Int Mode,
                            PrintSettings const *pps)
{
// Page number translations for booklet printing
BASED__CODE const char rgEightPagePortraitTranslation [ ] =
        {
        3, 12, 4, 0, 0, 0, 3, 10, 4, 0, 2, 0, 3, 8, 4, 0, 4, 0, 3,
6, 4, 0, 6, 0,
        1, 2, 0, 2, 10, 4, 1, 0, 0, 2, 12, 4, 1, 6, 0, 2, 6, 4, 1,
4, 0, 2, 8, 4,
BASED__CODE const char rgEightPageLandscapeTranslation [ ] =
        {
        3, 12, 4, 0, 0, 0, 3, 10, 4, 0, 2, 0, 3, 8, 4, 0, 4, 0, 3,
6, 4, 0, 6, 0,
        1, 0, 0, 2, 12, 4, 1, 2, 0, 2, 10, 4, 1, 4, 0, 2, 8, 4, 1,
6, 0, 2, 6, 4,
        }
BASED__CODE const char rgFourPageTranslation [ ] =
        {
        3, 4, 4, 0, 0, 0, 3, 2, 4, 0, 2, 0, 1, 0, 0, 2, 4, 4, 1, 2, 0, 2, 2, 4,
        };
BASED__CODE const char rgTwoPageTranslation [ ] =
        {
        3, 0, 4, 0, 0, 0, 1, 0, 0, 2, 0, 4,
        };
// These numbers are in groups of three and are coefficients
// that are plugged into a generic translation equation.
const char *prgTranslation;
int cPagesPerSheet;
switch (Mode)
        {
        case 3:
                prgTranslation = pps->fBookletLandscape ?
                                rgEightPageLandscapeTranslation
                                : rgEightPagePortraitTranslation;
                cPagesPerSheet = 16;
                break;
        case 2:
                prgTranslation = rgFourPageTranslation;
                cPagesPerSheet = 8;
                break;
        case 1:
                prgTranslation = rgTwoPageTranslation;
                cPagesPerSheet = 4;
                break;
        default:
                Assert (0) ; // Invalid booklet mode
}
Assert(prgTranslation != NULL);
// A sheet is a single piece of paper that gets printed on both sides
// A side is one side of the double sided sheet
int cSides = prpi ->nMaxPage + (prpi ->nMaxPage % 2) ;
int cSheets = cSides / 2;
int iThisSheet = PageNo / cPagesPerSheet;
int iFirstPageOnThis Sheet = iThisSheet * 2;
int cFollowingSheets = cSheets – (iThisSheet + 1); //The number of sheets
that
will be printed after this one
const char *rgLookup = &prgTranslation [(PageNo % cPagesPerSheet)
* 3];
int nPageNum = rgLookup [0] + iFirstPageOnThisSheet +
                        (rgLookup[1] * cSheets) + (rgLookup[2]
                        * cFollowingSheets);
return (nPageNum);
}
```

Figure 8A:
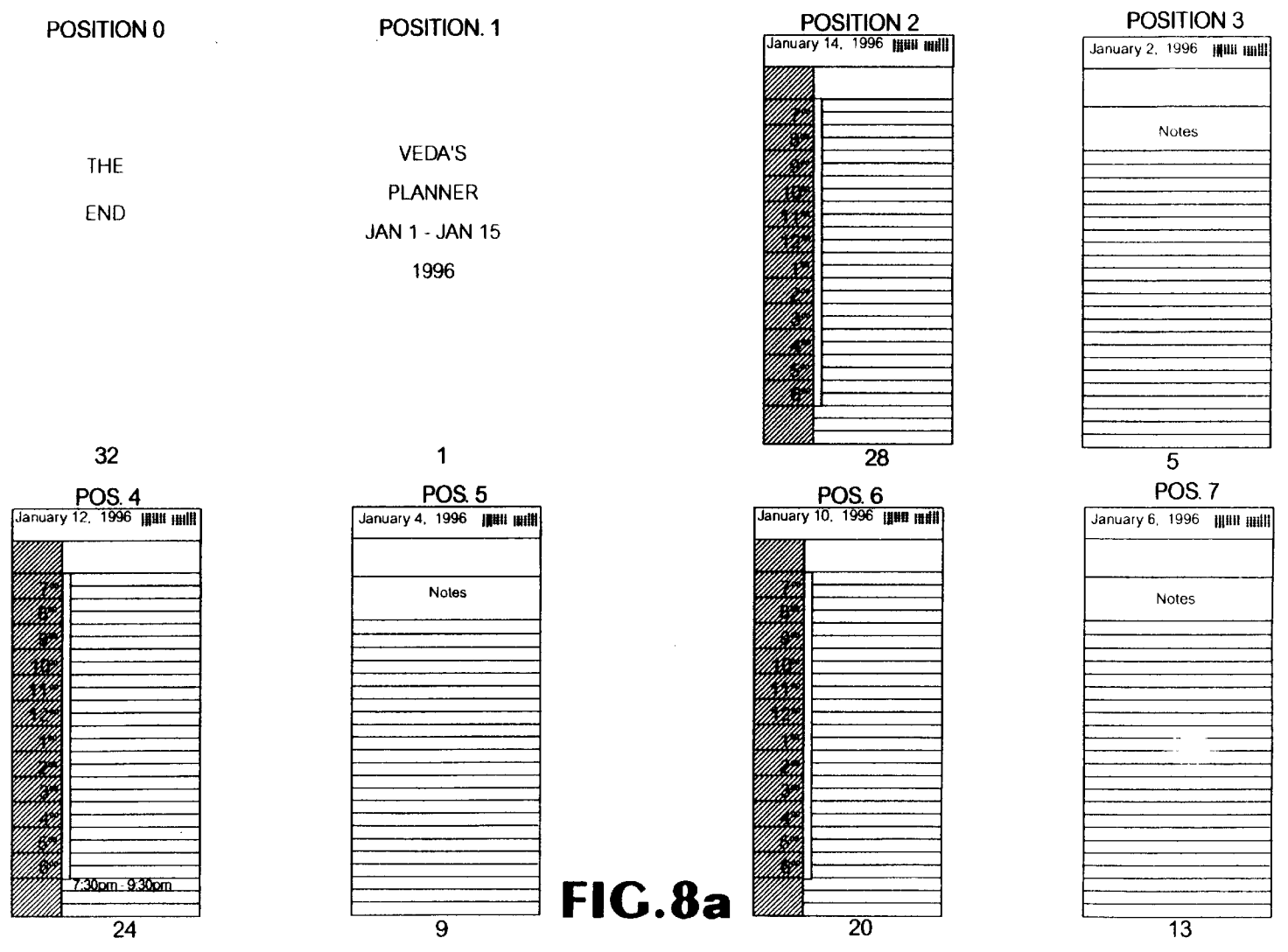
Figure 8B:
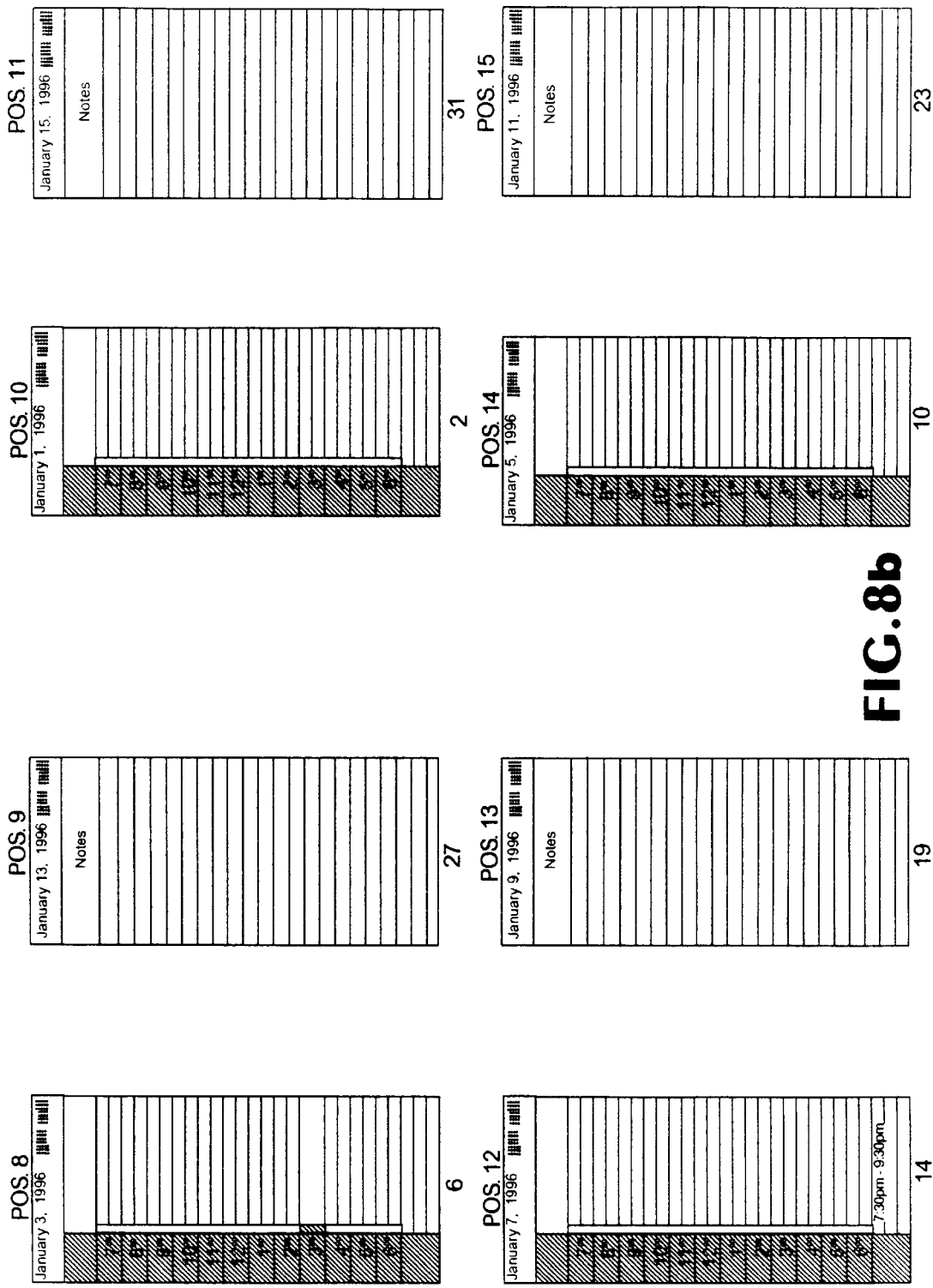
FIG. 8b is a diagram that illustrates the backside of sheet 0 printed by the print engine for a calendar with eight pages per side in accordance with the preferred embodiment of the present invention.
Figure 8C:
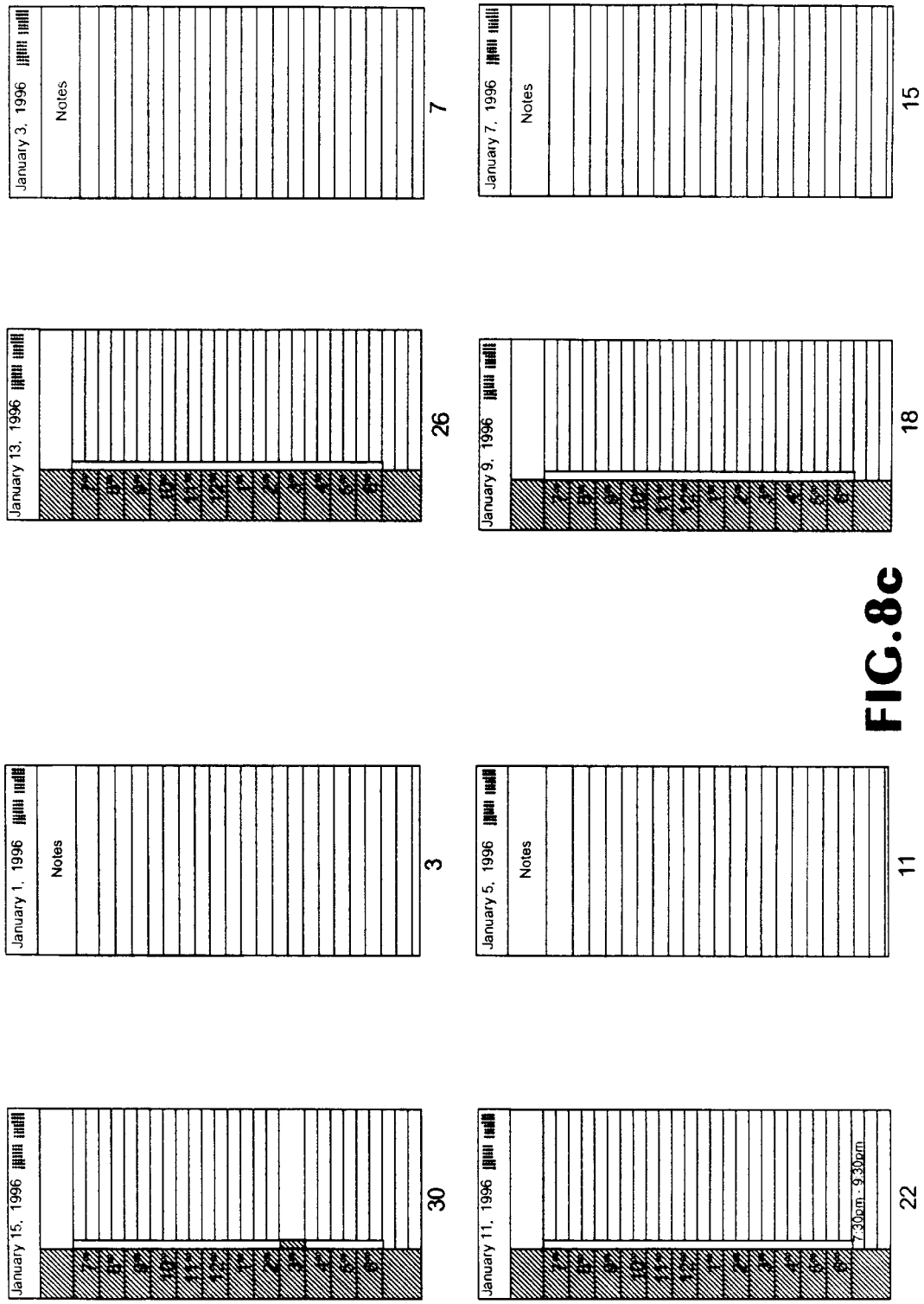
FIG. 8c is a diagram that illustrates the front side of sheet 1 printed by the print engine for a calendar with eight pages per side in accordance with the preferred embodiment of the present invention in accordance with the preferred embodiment of the present invention.

FIGS. 8a–8d are diagrams that illustrate the results printed by the printer 38 of FIG. 1 based upon the print system of FIG. 2 and Table 1 for a calendar with eight pages per side. FIG. 8a is the front side of sheet 0, FIG. 8b is the backside of sheet 0, FIG. 8c is the front side of sheet 1, and FIG. 8d is the backside of sheet 1. In this example, the user requested a printout of a personal calendar from Jan. 1, 1996 to Jan. 15, 1996. The user also specified that "X" equal eight, representing eight pages per side, and that "Y" equal portrait orientation. The program determined that there were thirty-two pages in the total document. The results for page position 0 on sheet 0 (FIG. 8a) are as follows:

sheet index=0;
F=0;
S=2;
Sl=1;
C1=3, C2=12, and C3=4; and
current page number=3+0+12*2+4*1=31.

Note, however, that the actual page number in page position 0 on sheet 0 (FIG. 8a) is thirty-two (32). In order to print out the correct number, the print engine will automatically add a value of one to the current page number. Therefore, in actuality, the current page number (page position 0 on sheet 0)(FIG. 8a) to be printed by the print engine is

31+1=32.

Steps 126–132 are repeated until all the pages on the current sheet have numbers. When all of the pages on the current sheet have been assigned proper numbers, the print engine 42 checks for additional sheets and repeats steps 118–138 until all sheets in the document have page numbers for all pages. The result for the above-identified example produces FIGS. 8a–8d. Using the same example, a calculation of page position 10 on sheet 1 (FIG. 8d) produces the following:

sheet index=1;
F=2;
S=2;
Sl=0;
C1=1, C2=0, and C3=0;
current page number (add one to account for actual printout by print engine)=1+2+0*2+0*0=3; and (3+1)=4.

In summary, the present invention provides an improved computer-implemented process for determining the proper sequence and placement of pages for a booklet comprising multiple pages. By utilizing the disclosed empirically-derived formula, the page positions for an infinite number of printing modes can be translated into actual page numbers. Therefore, the preferred embodiment of the present invention allows for arbitrarily complex booklet printing modes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for determining the sequence and placement of pages for a document comprising multiple pages, comprising the steps of:

(a) receiving based on user-provided input a number of said pages on each side of a sheet, said sheet containing two sides, each side having at least one of said pages;

(b) defining a total number of said pages for a document;

(c) setting an initial value for a sheet index that counts each sheet in said document;

(d) defining a current page (F) for a current sheet, wherein F is proportional to said sheet index;

(e) calculating a total number of sheets in said document (S) by dividing said total number of said pages for said document by a number of said pages on one of said sheets;

(f) calculating a total number of sheets remaining after said current sheet (Sl), said total number of remaining sheets defined by S−(sheet index+1);

(g) selecting a set of coefficients C1, C2, and C3 for said current page based on said number of pages on each sheet side;

(h) calculating a current page number for said current page, said current page number defined by C1+F+C2*S+C3*Sl;

(i) recording said current page number for said current page;

(j) repeating steps (g) through (i) for each remaining page on said current sheet;

(k) incrementing said index sheet; and (l) repeating steps (d) through (k) for each remaining sheet.

2. The method recited in claim 1 further comprising the step of receiving based on user-provided input a page layout, said layout defining a directional format for said document.

3. The method recited in claim 2, wherein said step of receiving based on user-provided input said page layout comprises receiving one of at least two orientations, said orientations being a landscape orientation and a portrait orientation.

4. The method recited in claim 1, wherein said step of setting said initial value for said sheet index comprises setting said initial value equal to zero.

5. The method recited in claim 1, wherein said step of defining said current page (F) for said current sheet comprises calculating said current page by multiplying said sheet index by a factor of two.

6. The method recited in claim 1, wherein said step of selecting said set of coefficients C1, C2, and C3 for said current page further comprises defining a page position index which points to a particular set of coefficients that corresponds to a current page position on said current sheet.

7. The method recited in claim 1, wherein said step of selecting said set of coefficients C1, C2, and C3 for said current page comprises selecting three coefficient values that are empirically determined based on said number of pages on each sheet side.

8. The method recited in claim 1 further comprising the steps of:

(m) printing each sheet containing said page numbers;

(n) cutting each sheet into smaller sub-sheets so that each sub-sheet comprises only two pages, each page having one of said page numbers;

(o) forming said document by stacking said sub-sheets so that said page numbers are in numerical order;

(p) creasing each sub-sheet by folding along a center line that divides one page of said sub-sheet from the remaining page; and (q) binding said sub-sheets along said center line so that said sub-sheets are attached to each other.

9. A computer-readable medium on which is stored a program module for determining the sequence and placement of pages for a document comprising multiple pages, said program module comprising instructions which, when executed by a computer, perform the steps of:

(a) receiving an input parameter for a number of said pages on each side of a sheet, said sheet containing two sides, each side having at least one of said pages;

(b) receiving an input parameter for a total number of said pages for a document;

(c) receiving an input parameter for a page layout, said page layout comprising one of at least two orientations, wherein said orientations are a landscape orientation and a portrait orientation;

(d) setting an initial value for a sheet index that counts each sheet in said document to zero;

(e) calculating a current page (F) for a current sheet by multiplying said sheet index by a factor of two;

(f) calculating a total number of sheets in said document (S) by dividing said total number of said pages for said document by a number of said pages on one of said sheets;

(g) calculating a total number of sheets remaining after said current sheet (Sl), said total number of remaining sheets defined by S−(sheet index+1);

(h) selecting a set of coefficients C1, C2, and C3 for said current page based on said number of pages on each sheet side;

(i) calculating a current page number for said current page, said current page number defined by C1+F+C2*S+C3*Sl;

(j) providing said current page number for said current page to an output device;

(k) verifying that additional pages are available for said current sheet;

(l) repeating steps (h) through (k) for each remaining page on said current sheet;

(m) printing said current page number for each page for said current sheet;

(n) incrementing said index sheet; and (o) repeating steps (e) through (n) for each remaining sheet.

10. The computer-readable medium recited in claim 9, wherein said step of selecting said set of coefficients C1, C2, and C3 for said current page further comprises defining a page position index which points to a particular set of coefficients that corresponds to a current page position on said current sheet.

11. The computer-readable medium recited in claim 9, wherein said step of selecting a set of coefficients C1, C2, and C3 for said current page comprises selecting three coefficient values that are empirically determined based on said number of pages on each sheet side.

12. In a computer system including an input device, a print engine, a page numbering system, and an output device, said computer system for determining the sequence and placement of pages for a document comprising multiple pages, comprising:

said input device operative to:
   i. input an input parameter for a number of said pages on each side of a sheet, said sheet containing two sides, each side having at least one of said pages,
   ii. input an input parameter for a total number of said pages for a document, and
   iii. input an input parameter for a page layout, said layout defining a directional format for said document;

said print engine operative to control printing operations including:
   i. process a print request,
   ii. process said input parameter for said number of said pages on each side of said sheet, said sheet containing two sides, each side having at least one of said pages,
   iii. process said input parameter for said total number of said pages for said document,
   iv. process said input parameter for said page layout, and
   v. send an instruction to said output device to print said current page based on said input parameters;

said page numbering system operative to receive said processed input parameters from said print engine and based on said processed input parameters, said page numbering system further operative to:
   i. set an initial value for a sheet index that counts each sheet in said document,
   ii. define a current page (F) for a current sheet, wherein F is proportional to said sheet index,
   iii. calculate a total number of sheets in said document (S) by dividing said total number of said pages for said document by a number of said pages on one of said sheets,
   iv. calculate a total number of sheets remaining after said current sheet (Sl), said total number of remaining sheets defined by S−(sheet index+1),
   v. select a set of coefficients C1, C2, and C3 for said current page based on said number of pages on each sheet side,
   vi. calculate a current page number for said current page, said current page number defined by C1+F+C2*S+C3*Sl,
   vii. provide said current page number for said current page to said print engine, and
   viii. verify whether additional pages are available for said current sheet; and said output device, responsive to said instruction from said print engine, prints said current page number for each page for said current sheet;

said print engine further operative to increment said index sheet.

13. The computer system recited in claim 12, wherein said input parameter for said page layout selects one of at least two orientations, said orientations being a landscape orientation and a portrait orientation.

14. The computer system recited in claim 12, wherein said page numbering system sets an initial value for said sheet index by setting said initial value for said sheet index equal to zero, and said page number system defines said current page (F) for said current sheet by multiplying said sheet index by a factor of two.

15. The computer system recited in claim 12, wherein said page numbering system selects said set of coefficients C1, C2, and C3 for said current page by defining a page position index which points to a particular set of coefficients that corresponds to a current page position on said current sheet.

16. The computer system recited in claim 12, wherein said page numbering system selects said set of coefficients C1, C2, and C3 for said current page by selecting three coefficient values that are empirically determined based on said number of pages on each sheet side.

17. The method of claim 12, further comprising the steps of setting an initial value for a sheet index that counts each sheet in said document, said initial value being equal to zero, and for each of said sheets in said document, incrementing said sheet index after determining all current page numbers for each of said pages on said current sheet.

18. A method for determining the sequence and placement of pages for a document comprising multiple sheets, comprising the steps of:

(a) receiving based on user-provided input a number of said pages on each side of said sheet, said sheet containing two sides, each side having at least one of said pages;

(b) receiving based on user-provided input a page layout, said page layout defining a directional format for said sheet;

(c) determining a total number of said pages for a document;

(d) determining a total number of sheets in said document by dividing said total number of said pages for said document by said number of said pages on one of said sheets;

(e) determining a total number of sheets remaining after a current sheet;

(f) defining a current page for said current sheet;

(g) selecting a set of coefficients C1, C2, and C3 for determining a current page number for said current page on said current sheet based on said number of pages on each sheet side and said page layout;

(h) determining said current page number for said current page, said current page number based on said set of coefficients C1, C2, and C3, said current page on said current sheet, said total number of sheets in said document, and said total number of sheets remaining after said current sheet;

(i) recording said current page number for said current page;

(j) repeating steps (f) through (i) for each page remaining on said current sheet; and (k) repeating steps (e) through (j) for each remaining sheet in said document.

19. The method of claim 18, wherein said step of receiving based on user-provided input a page layout comprises receiving one of at least two orientations, said orientations being a landscape orientation and a portrait orientation.

20. The method of claim 18, wherein said step of selecting a set of coefficients C1, C2, and C3 further comprises defining a page position index which points to a particular set of empirically-derived coefficient values that corresponds to a current page position on said current sheet.

21. The method of claim 18, wherein the step of determining said current page number for said current page comprises calculating said current page number, said current page number defined by the sum of i) a first coefficient value for C1, ii) said current page for said current sheet, iii) said total number of sheets in a document multiplied by a second coefficient value for C2, and iv) said total number of sheets remaining after said current sheet multiplied by a third coefficient value for C3.

22. The method of claim 17, wherein said current page for a current sheet is proportional to said sheet index and said current page for said current sheet is defined by multiplying said sheet index by a factor of two.

23. The method of claim 17, wherein said total number of sheets remaining after said current sheet is defined by subtracting the sum of said sheet index plus one from said total number of sheets in said document.

* * * * *